(12) United States Patent
Johnston (10) Patent No.: US 7,428,075 B2
(45) Date of Patent: Sep. 23, 2008

(54) CIRCUITRY TO SUPPORT JUSTIFICATION OF PWM PIXELS

(75) Inventor: Peter Johnston, San Mateo, CA (US)

(73) Assignee: Konica Minolta Systems Laboratory, Inc., Huntington Beach, CA (US)

( * ) Notice: Subject to any disclaimer, the term of this patent is extended or adjusted under 35 U.S.C. 154(b) by 141 days.

(21) Appl. No.: 11/480,221

(22) Filed: Jun. 30, 2006

(65) Prior Publication Data

US 2008/0007750 A1    Jan. 10, 2008

(51) Int. Cl.
*G06F 15/00* (2006.01)
*H04N 1/40* (2006.01)
(52) U.S. Cl. .................................. 358/1.9; 358/3.01
(58) Field of Classification Search .............. 358/300, 358/1.6, 1.8, 1.9, 1.16, 3.01
See application file for complete search history.

(56) References Cited

U.S. PATENT DOCUMENTS

| | | | |
|---|---|---|---|
| 5,477,257 A * | 12/1995 | Murata | 347/135 |
| 6,252,675 B1 | 6/2001 | Jacobs | |
| 6,775,032 B2 | 8/2004 | Jacobs | |
| 7,031,025 B1 | 4/2006 | He et al. | |
| 7,064,859 B1 | 6/2006 | Dittrich et al. | |
| 2001/0030769 A1 | 10/2001 | Jacobs | |
| 2004/0156079 A1 | 8/2004 | Marshall et al. | |

* cited by examiner

*Primary Examiner*—Mark Zimmerman
*Assistant Examiner*—Fan Zhang
(74) *Attorney, Agent, or Firm*—Finnegan, Henderson, Farabow, Garrett & Dunner LLP (57) ABSTRACT

The methods and systems presented herein use well-known logic devices in combination with one or more pulse-width-modulation (PWM) devices in order to create left- and right-justified width-modulated pulses. In some embodiments, justification ability is added without the need to alter an existing PWM device. In some embodiments, the generation of justified pulses is accomplished by a logic circuit in combination with an inherently left- or right-justified PWM device. Some embodiments of the present invention may include, for example, any combination of logical selectors, inverters, and flip-flops. In some embodiments, a justification circuit may receive as input any combination of one or more bits of pixel data, one or more bits of justification selection data, and one or more clock signal. In some embodiments, a justification circuit may output one more signals representing left or right-justified pulses.

19 Claims, 5 Drawing Sheets

Sample screen for 20% grayscale with a 15° screen angle.

Sample screen for 20% grayscale with a 15° screen angle.

Without PWM

Halftone cell

FIG 4A

One pixel

With PWM but without Justification Circuitry

Left-Justified Pixels 410

Halftone cell

FIG 4B

Sample screen for 20% grayscale with a 15° screen angle.

FIG 4C

CIRCUITRY TO SUPPORT JUSTIFICATION OF PWM PIXELS

CROSS-REFERENCE TO RELATED APPLICATIONS

This application is related to the following U.S. patent applications "Systems for Generating a Pulse Width Modulated Signal" Ser. No. 11/479,294, "Method and Apparatus for Image Alignment" Ser. No. 11/479,562, "Systems and Methods for Processing Pixel Data for a Printer" Ser. No. 11/479,596, and "Systems and Methods for Processing Pixel Data for a Printer" Ser. No. 11/479,896 filed concurrently herewith and which are all incorporated herein in their entirety for all purposes.

BACKGROUND

1. Field of the Invention

The general field of this invention is electronic printer technology. The present invention relates to pulse-width-modulation (PWM) circuits, image-forming apparatuses, and optical printing methods; and more particularly to pulse-width-modulation circuits for positional accuracy of modulated pixels on a printed page.

2. Description of Related Art

One limitation of typical current printer technology is that the application of ink or toner to a particular region of an image is essentially binary in nature—the printer may either apply toner or not. Modern printers typically use screens to generate smooth grayscales so that images and halftones can be reproduced accurately. Screens are typically used to build up a pattern of very small toner "dots" (e.g., laser on/off patterns) that when viewed by the naked eye give the illusion of a halftone.

To create a color image, some printers print an image as an overlay of four separate color planes: Cyan, Magenta, Yellow, and Key (black) ("CMYK"). For color screens, each color plane typically uses a different screen, and the screens may be offset with respect to one another. This screen angle offsetting technique is typically used to avoid the appearance of objectionable moire patterns in a final image.

The ability to left and right-justify pixels allows for more accurate control of the shape and size of printed dots. By combining the use of a pulse-width-modulation (PWM) device and a method of left and right-justification of pulse-width-modified pixels, additional control may be achieved. Pulse-width modification of pixels allows for more accuracy in a final image because it allows for the printing of partial pixels where a desired image occupies only part of a pixel space. Adding left and right-justification to pulse-width-modified pixels allows for partial pixels to be right-justified on the left edge of a halftone dot and left-justified on the right edge of a halftone dot, resulting in sharp edges and accurate printed representation of the desired halftone dot. Thus, there is a need for systems and methods for generating left and right-justified pulses and for adding such capabilities to existing PWM circuits.

SUMMARY OF THE INVENTION

In accordance with some embodiments of the present invention, systems and methods for generating left- and right-justified width-modulated pulses are presented. A determination may be made whether an output PWM signal that is to be generated based on first pixel data is to be right-justified or left-justified. Data and clock signals may be received and a left- and right-justified width-modulated pulse may be generated. The system may select between a pixel data signal and the bitwise inverse of the pixel data signal according to whether left or right justification is desired.

In some embodiments, the system may generate intermediate signals and choose between the intermediate signals according to whether left or right justification is desired. The system may receive a justification selection signal and use the justification selection signal to select between intermediate signals. The system may generate one or more intermediate justified PWM signals. In some embodiments, there may be two intermediate justified PWM signals that represent the inverse of each other. The system may select the final output PWM signal between the intermediate justified PWM signals. These and other embodiments are further explained below with respect to the following figures.

DETAILED DESCRIPTION

Reference will now be made in detail to one or more exemplary embodiments of the present invention as illustrated in the accompanying drawings. Wherever possible, the same reference numbers will be used throughout the drawings to refer to the same or like parts.

Figure 1:
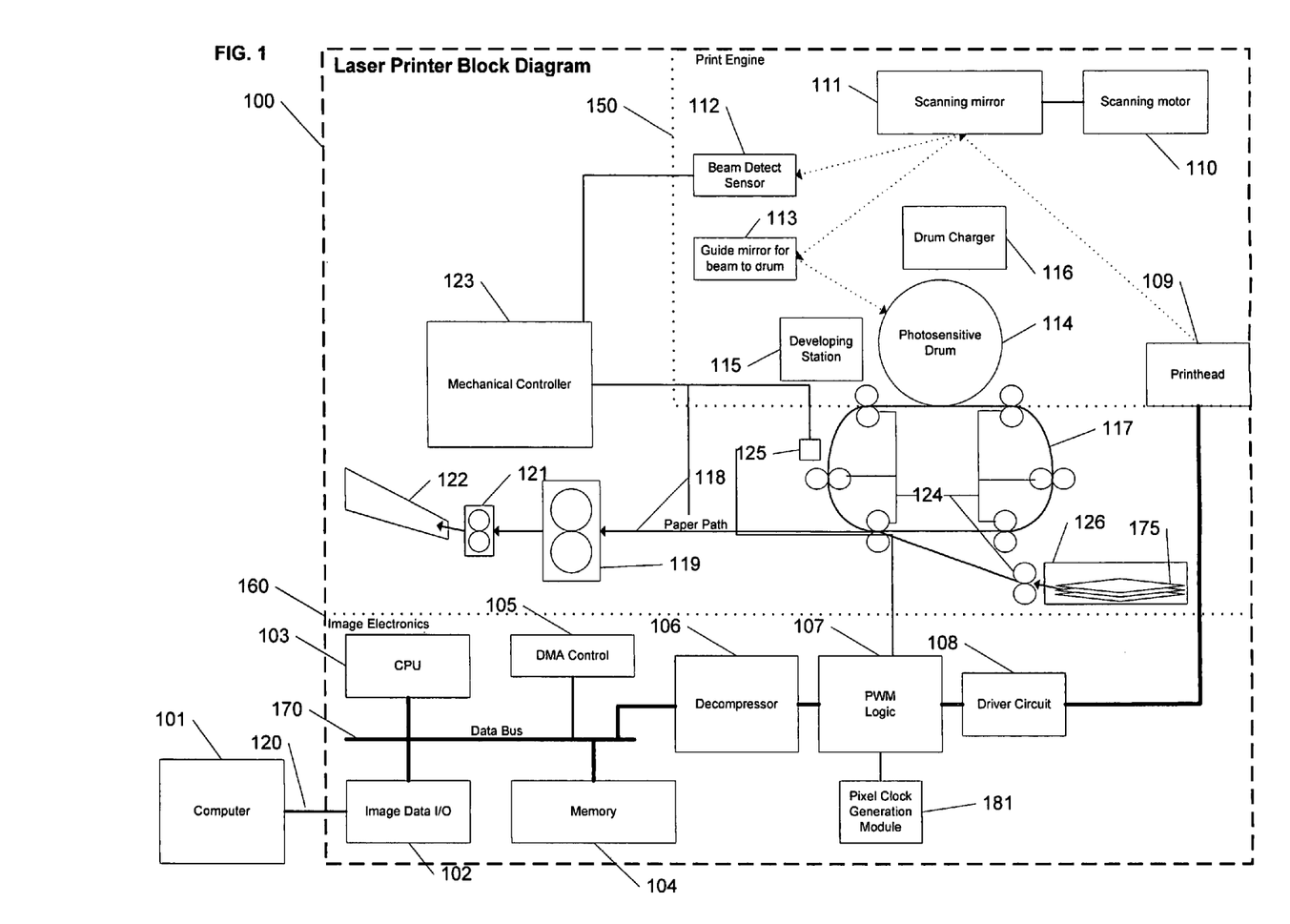
FIG. 1 shows a block diagram of an exemplary printer coupled to an exemplary computer, according to one or more embodiments of the present invention.

FIG. 1 is a block diagram of exemplary printer 100, which is coupled to exemplary computer 101. In some embodiments, printer 100 may be a laser printer, an LED printer, or any other printer consistent with principles of the present invention. Computer 101 may be a computer workstation, desktop computer, laptop computer, or any other computing device capable of being used with printer 100. Connection 120 couples computer 101 and printer 100 and may be implemented as a wired or wireless connection using conventional communication protocols and/or data port interfaces. In general, connection 120 can be any communication channel that allows transmission of data between the devices. In one embodiment, for example, the devices may be provided with conventional data ports, such as USB, FIREWIRE and/or serial or parallel ports for transmission of data through appropriate connection 120. The communication links could be wireless links or wired links or any combination consistent with embodiments of the present invention that allows communication between computing device 101, and printer 100.

In some embodiments, data received by printer 100 may be routed internally along internal data paths, such as exemplary data bus 170, and other data and control signal paths (not shown) to various internal functional modules of printer 100 as determined by control logic in printer 100. In some embodiments, data transmitted to printer 100 by computer 101 may also include destination addresses and/or commands to facilitate routing. In some embodiments, data bus 170 may include a subsystem that transfers data or power among modules. In some embodiments, data bus 170 may logically connect several modules over the same set of wires or over separate wires for each connection. In some embodiments, data bus 170 may be any physical arrangement that provides the same logical functionality as a parallel bus and may include both parallel and bit-serial connections. In some embodiments, data bus 170 may be wired in either an electrical parallel or daisy chain topology, or connected by switched hubs.

In some embodiments, image data input/output ("IO") module 102, central processing unit (CPU) 103, direct memory access (DMA) control module 105, memory 104, and decompressor module 106, may be coupled using data bus 170. Data received by image data I/O module 102 may be placed in memory 104 using DMA control module 105 under the control of the CPU 103 according to some embodiments of the present invention. Decompressor module 106 may also be coupled to pulse wave modulation (PWM) logic module 107. In some embodiments, decompressor module 106 may receive compressed pixel data, decompress the received pixel data, and send it to PWM logic module 107. Various data and control signal paths may couple PWM logic module 107, pixel clock generation module 181, driver circuit 108, printhead 109, mechanical controller 123, beam detect sensor 112 and transfer belt position sensor 125. In some embodiments, printhead 109 may be a laser printhead. In some embodiments, beam detect sensor 112 and/or belt position sensor 125 may each generate several signals for each scan line in an image, or for a set of scan lines in an image, or for each image and send the generated signals to mechanical controller 123, which then sends signals to PWM logic module 107.

Driver circuit 108 may be communicatively coupled to PWM logic module 107 and printhead 109. In some embodiments, scanning mirror 111 may be mechanically or electromagnetically coupled to scanning motor 110, which may be used to rotate scanning mirror 111. Light from printhead 109 may be transmitted to scanning mirror 111 and scanning mirror 111 may reflect that light, at different times, to beam detect sensor 112 and beam-to-drum guide mirror 113. Beam-to-drum guide mirror 113 may reflect light from scanning mirror 111 to photosensitive drum 114. Drum charger 116 may be used to charge photosensitive drum 114.

Paper 175 may be passed from paper input tray 126 through transfer rollers 124 to transfer belt 117 where latent images from photosensitive drum 114 may be transferred to paper 175. In some embodiments, latent images from photosensitive drum 114 may be developed with toner at developing station 115 before transfer to paper 175. The transfer of images from photosensitive drum 114 to paper 175 may occur while paper 175 is on transfer belt 117. After the image has been transferred, paper 175 may be moved over paper path 118 using transfer rollers 124 and past fuser 119, guide rollers 121, and to paper output tray 122. In some embodiments, fuser 119 may facilitate the bonding of the transferred image to paper 175.

Exemplary print engine 150 of printer 100 may include beam detect sensor 112, beam-to-drum guide mirror 113, developing station 115, photosensitive drum 114, drum charger 116, scanning mirror 111, scanning motor 110, and printhead 109. Exemplary image electronics subsystem 160 may include CPU 103, image data I/O module 102, memory 104, DMA control module 105, data bus 170, decompressor module 106, PWM logic module 107, and driver circuit 108. The various modules and subsystems described above may be implemented by hardware, software, or firmware or by various combinations thereof.

In some embodiments, computer 101 may send image data to image electronics subsystem 160 over connection 120. The image data sent from the computer 101 may be compressed. In some embodiments, the compressed image data may be in a line-sequential compressed format. Various other formats such as Postscript, PCL, and/or other public or proprietary page description languages may also be used to transfer image data. After image data is received by image data I/O module 102, the image data may be placed in memory 104 using DMA control module 105 under the control of CPU 103. In some embodiments, when image data for a complete page has been stored in memory 104, a print sequence may be initiated. In some embodiments, mechanical controller 123 may initiate operations of scanning motor 110, photosensitive drum 114, and transfer belt 117 through appropriate data and/or control signals.

Beam detect sensor 112 can detect a laser beam's position and generate pulses that are sent to image electronics subsystem 160 so that image data can be properly aligned from line to line in a printed image. In some embodiments, at the beginning of a scan of each line of the image, light from the printhead 109 may be reflected by scanning mirror 111 onto beam detect sensor 112. Beam detect sensor 112 may signal mechanical controller 123 which, in turn, may send a beam detect signal 240 to PWM logic module 107. In some embodiments, a separate signal typically referred to as top of data (TOD) or "vsync" may also be generated by mechanical controller 123, based on information received from transfer belt position sensor 125. The TOD or vsync signal indicates when image data transfer can begin for paper 175. For example, in some embodiments, when paper 175 passes transfer belt position sensor 125, a TOD signal may be sent to PWM logic module 107 via mechanical controller 123. Once the TOD signal is received, CPU 103 may initiate a transfer from memory 104 to decompressor module 106. In some embodiments, decompressor module 106 may decompress image data and pass the resulting raw image data to PWM logic module 107. The resultant PWM pulses from PWM logic module 107 may then be streamed to driver circuit 108, which may then transmit the PWM pulses to printhead 109.

In some embodiments, laser light from printhead 109 may be pulsed and reflected off scanning mirror 111 and beam-to-drum guide mirror 113, causing a latent image of charged and discharged areas to be built up on photosensitive drum 114. In some embodiments, toner develops this latent image at the developing station 115 and the latent image may be transferred to transfer belt 117. For a multi-component image, such as a color image, the latent image building process may repeat for each of the components. For example, for CMYK color printers, which use cyan ("C"), magenta ("M"), yellow ("Y"), and black ("K"), the latent image building process on photosensitive drum 114 may be repeated for each of the colors C, M, Y, and K. In some embodiments, when all components have been assembled on transfer belt 117, paper 175 may be fed from paper input tray 126 to transfer roller 124 where the image may be transferred to paper 175. In some embodiments, fuser 119 may then fix the toner to paper 175, which is sent to paper output tray 122 using guide rollers 121.

The pixel clock generation module 181 may be a crystal oscillator or a programmable clock oscillator, or any other appropriate clock generating device. In some embodiments, such as in a "multi-pass" printer 100, which sends the video data for each color serially in sequence, the frequency of the clock generated by the pixel clock generation module 181 may be fixed among each pass of the printer. In an example multi-pass printer 100, the pixel clock generation module 181 may be a crystal oscillator. In another embodiment, such as a printer 100 that uses multiple sets of print engines 150, sometimes collectively referred to as a "tandem engine", the frequency of each channel may be calibrated if the frequencies differ among the pixel clocks corresponding to each of the color components. In such embodiments, one or more programmable clock oscillators may be used to allow for calibration.

Exemplary embodiments of printer 100 may include driver circuit 108 driving multiple sets of print engine 150, which may be connected to multiple printheads 109. In some embodiments, printheads 109 could all be laser printheads. There may also be a plurality of individual modules of image electronics subsystem 160. For example, a single decompressor module 106 may be connected to multiple PWM logic modules 107 with each PWM module 107 being connected to one or more pixel clock generation modules 181 and one or more driver circuits 108. Decompressor module 106 could provide each PWM logic module 107 with one or more color components of an image, which would then be sent to the multiple driver circuits 108 for onward transmission to one or more sets of print engine 150.

In other embodiments, multiple decompressor modules 106 may be coupled to multiple PWM logic modules 107. Each decompressor module 106 may provide a PWM logic module 107 with a decompressed component of the image. In other embodiments a single PWM logic module 107 could provide multiple components of the image to multiple driver circuits 108.

In some embodiments, printer 100 may have multiple lasers per laser printhead. In some embodiments, printhead 109 may receive multiple lines of data from driver circuit 108 and project the multiple lines of data to scanning mirror 111. Scanning mirror 111 may then reflect the multiple lines of data to beam detect sensor 112 and guide mirror 113, which may reflect the multiple lines to photosensitive drum 114. In some embodiments, the beam detect sensor 112 may detect a signal, such as a laser signal, reflected off of the scanning mirror 111, or may also detect multiple signals reflected off scanning mirror 111.

The coupling discussed herein may include, but is not limited to, electronic connections, coaxial cables, copper wire, and fiber optics, including the wires that comprise data bus 170. The coupling may also take the form of acoustic or light waves, such as lasers and those generated during radiowave and infra-red data communications. Coupling may also be accomplished by communicating control information or data through one or more networks to other data devices. Mechanical or electromechanical coupling as used herein may include, but is not limited to, the use of physical components such as motors, gear coupling, use of universal joints, or any other mechanical or electromechanical device usable to couple items together.

Each of the logical or functional modules described above may comprise multiple modules. The modules may be implemented individually or their functions may be combined with the functions of other modules. Further, each of the modules may be implemented on individual components, or the modules may be implemented as a combination of components.

For example, CPU 103, decompressor module 106, PWM logic module 107, may each be implemented by a field-programmable gate array (FPGA), an application-specific integrated circuit (ASIC), a complex programmable logic device (CPLD), a printed circuit board (PCB), a combination of programmable logic components and programmable interconnects, single CPU chip, a CPU chip combined on a motherboard, a general purpose computer, or any other combination of devices or modules capable of performing the tasks of modules 103, 106 or 107. In some embodiments, memory 104 may comprise a random access memory (RAM), a read only memory (ROM), a programmable read-only memory (PROM), a field programmable read-only memory (FPROM), or other dynamic storage device, coupled to data bus 170 for storing information and instructions to be executed by image electronics subsystem 160.

Figure 2:
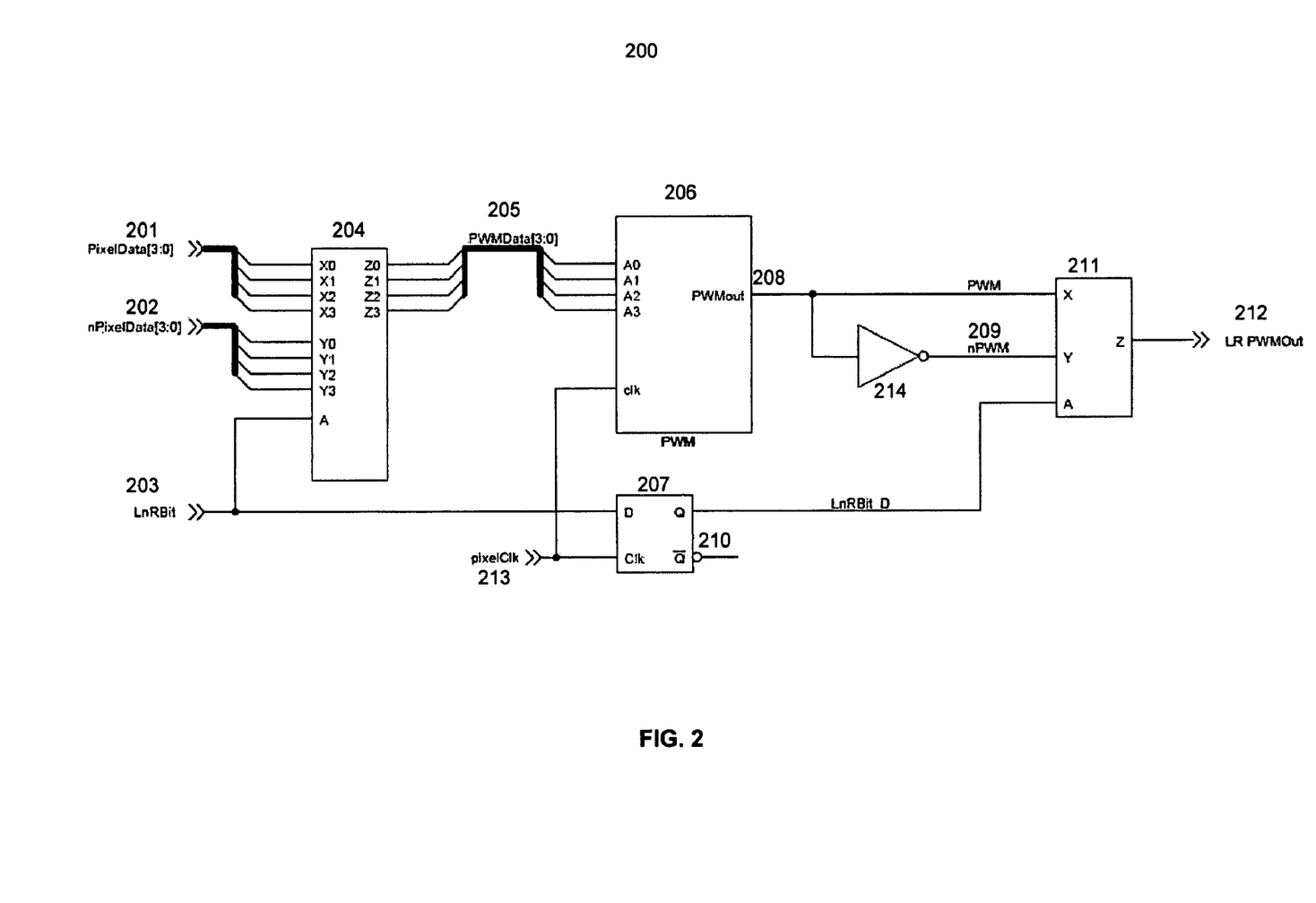
FIG. 2 shows a simplified logic diagram showing an exemplary logic circuit for supporting left and right justification of pulse-width-modulated pixels, according to one or more embodiments of the present invention.

FIG. 2 shows a logic diagram of an exemplary circuit 200 for supporting the generation of left- and right-justification of pulse-width-modulated pixels, according to one or more embodiments of the present invention. In some embodiments, Pixel Data 201 and Inverse_Pixel Data 202 may be received as data inputs at Pixel Data Selector 204. Pixel Data 201 may correspond to a first pixel data, and Pixel Data 202 may correspond to a second pixel data. In exemplary circuit 200, LnRBit 203 may indicate whether left- or right-justified pulse-width-modified pixels are desired. LnRBit 203 may correspond to a justification selection signal. In some embodiments, Pixel Data 201, Inverse_Pixel Data 202, and LnRBit 203 may be passed to exemplary circuit 200 and Pixel Data Selector 204 from Decompressor 106. Inverse_Pixel Data 202 may also be generated within exemplary circuit 200 by applying one or more inverting logic gates (NOT gates) to Pixel Data 201.

Pixel Data 201 may comprise multiple bits of data per clock cycle. For example, if each connection can hold four bits and sixteen bits of Pixel Data 201 are to be transmitted each pixel clock cycle, then Pixel Data 201 may be communicated via four connections to Pixel Data Selector 204. Accordingly, exemplary Inverse_Pixel Data 202 may be the bitwise inverse of Pixel Data 201 and comprise an equivalent number of bits. As shown in FIG. 2, exemplary Pixel Data 201 may correspond to the X-value inputs of Pixel Data Selector 204 and Inverse_Pixel Data 202 may correspond to the Y-value inputs of Pixel Data Selector 204, as shown in FIG. 2.

Pixel Data Selector 204 may be any kind of logic device that allows for selected output. For example, Pixel Data Selector 204 may be implemented as a selector chip, a portion of an integrated circuit chip, or an appropriately configured group of logic gates.

In exemplary circuit 200, LnRBit 203, which is input to Pixel Data Selector 204, may indicate whether left- or right-justified pulse-width-modified pixels are desired. In exemplary circuit 200, when the value of LnRBit is high, or 1 (one), such a condition may indicate that left-justification is desired; when the value of LnRBit is low, or 0 (zero), such a condition may indicate that right-justification is desired. In exemplary circuit 200, when LnRBit is high, or 1 (one), indicating left-justification, exemplary Pixel Data Selector 204 can pass its X-value inputs to its Z-value outputs so that its Z-value outputs are bitwise identical to pixel data 201. When the value of LnRBit is low, or 0 (zero), indicating right-justification, Pixel Data Selector 204 can pass its Y-value inputs to its Z-value outputs so that its Z-value outputs are bitwise identical to Inverse_Pixel Data 202.

The output bits of Pixel Data Selector 204 may correspond to PWM Data 205. In the example shown in FIG. 2, PWM Data 205 corresponds to the Z-value outputs (Z0-Z3) of Pixel Data Selector 204. Thus, in the present exemplary embodiment, when LnRbit is high, or 1 (one), PWM Data 205 may be bitwise identical to Pixel Data 201. In exemplary circuit 200, when LnRbit is low, or 0 (zero), PWM Data 205 may be bitwise identical to Inverse_Pixel Data 201.

Pulse-Width Modulating Circuit (PWM) 206 may receive as input PWM Data 205 and Pixel Clock 213. PWM 206 may be any device that creates a pulse-width-modulated output. For example, PWM 206 may be any chip, circuit, circuit block, integrated circuit (IC) block, field-programmable gate array (FPGA), or group of logic gates that creates a pulse-width-modulated output. PWM 206 may be inherently left-justified or inherently right-justified. In the embodiment of FIG. 2, PWM 206 may be, for example, the PWM described in related patent applications "Systems for Generating a Pulse Width Modulated Signal" Ser. No. 11/479,294 and "Method and Apparatus for Image Alignment" Ser. No. 11/479,562.

Pixel Clock 213 may be received into exemplary circuit 200 and PWM 206. In some embodiments, Pixel Clock 213 may be received from Pixel Clock Generation Module 181. In other embodiments, Pixel Clock 213 may be generated within exemplary circuit 200, for example, by a crystal oscillator or a programmable clock oscillator, or any other appropriate clock-generating device.

As shown in the exemplary circuit of FIG. 2, the output pulse of PWM 206 is inherently left-justified and PWM 206 generates one pulse per clock cycle of pixel clock pixelClk 213. In the exemplary circuit of FIG. 2, each pixel is created in one clock cycle, and PWM 206 generates an inherently left-justified pulse, where the pulse-width may be proportional to the real percentage of the final pixel on which ink is to be printed. In the exemplary circuit of FIG. 2, the output pulse of PWM 206 may be any one of 16 widths, ranging from one sixteenth of a pixel to the full width of the pixel. In other embodiments, the output pulse of PWM 206 may allow centering, in which case the circuitry may be appropriately modified.

The PWM pulse generated by PWM 206 may be delayed by one or more cycles of pixelClk 213 from the time the corresponding input was received by PWM 206. In the circuit shown in FIG. 2, the delay is one clock cycle. In some embodiments, the pulse width of the output is determined by the value of signals $A_0$-$A_3$ received at the A-value inputs of PWM 206. In exemplary circuit 200 as shown in FIG. 2, the width of the output pulse PWMOut 208 is determined by the four-bit number represented by PWM Data 205 and received at the A-value inputs of PWM 206.

In exemplary circuit 200 of FIG. 2, the value of PWMout 208 may be equal to that of the output pulse of PWM 206. PWMout 208 may also correspond to a first intermediate PWM signal and may be used to generate output PWM signal LR_PWMout 212. In some embodiments Inverting Logic Gate 214 may take PWMout 208 as input and generate Inverse_PWMout 209 as an output. Inverse_PWMout 209 may correspond to a second intermediate PWM signal.

In exemplary circuit 200 of FIG. 2, Flip-flop 207 receives Pixel Clock 213 as clock input and LnRBit 203 as the data input. Flip-flop 207 may be, for example, any appropriately configured logic circuit, combination of logic gates, or logic flip-flop. As shown in FIG. 2, Flip-flop 207 may be a D-type, positive-edge-triggered flip-flop. Flip-flop 207 may output, at Q, the value of input D at the time of the immediately previous rising edge of the clock input. In exemplary circuit 200 shown in FIG. 2, the state of output Q is updated to match the state of input D at the rising clock edge of the next clock cycle. In exemplary circuit 200 as shown in FIG. 2, the Q output of Flip-flop 207 corresponds to LnRBit_D 210.

Output Selector 211 may receive as data inputs PWMout 208 and Inverse_PWMout 209. Output Selector 211 may also receive LnRBit_D 210 as selection input. In the embodiment of FIG. 2, PWMout 208 corresponds to the X-value data input of Output Selector 211, Inverse_PWMout 209 corresponds to the Y-value data input of Output Selector 211, and LnRBit_D 210 corresponds to the A-value selection input of Output Selector 211. In the embodiment of FIG. 2, the Z-value output of Output Selector 211 corresponds to the value of LR_PWMout 212.

In the exemplary embodiment of FIG. 2, the A-value selection input of Output Selector 211 determines which of its data input values is passed to output value Z of Output Selector 211. In the exemplary embodiment of FIG. 2, when the A-value input is high, or 1 (one), the value of data input X is passed to data output value Z. In the exemplary embodiment of FIG. 2, when the A-value input is low, or 0 (zero), the value of data input Y is passed to data output value Z.

Thus, in the exemplary embodiment of FIG. 2, when the LnRBit_D 210 state is high, or 1 (one), PWMout 208 is passed to LR_PWMout 212. In the exemplary embodiment of FIG. 2, when the LnRBit_D 210 state is low, or 0 (zero), Inverse_PWMout 209 is passed to LR_PWMout 212.

Accordingly, in the exemplary embodiment illustrated by FIG. 2, LR_PWMout 212 represents the appropriate left- or right-justified output pulse generated by exemplary circuit 200. In some embodiments, LR_PWMout 212 may be coupled to Driver Circuit 108 as illustrated in FIG. 1. Further, in some embodiments, LR_PWMout 212 may be coupled to Mechanical Controller 123 as illustrated in FIG. 1.

In some embodiments, Pixel Data 201 may update at each rising edge of Pixel Clock 213 (thus, once per clock cycle) and Pixel Data 201 may represent the desired width of the shaded area for each pixel. For example, if the size of Pixel Data 201 is four bits, then a desired width may be represented to an accuracy of one-sixteenth of the width of one pixel.

Figure 3:
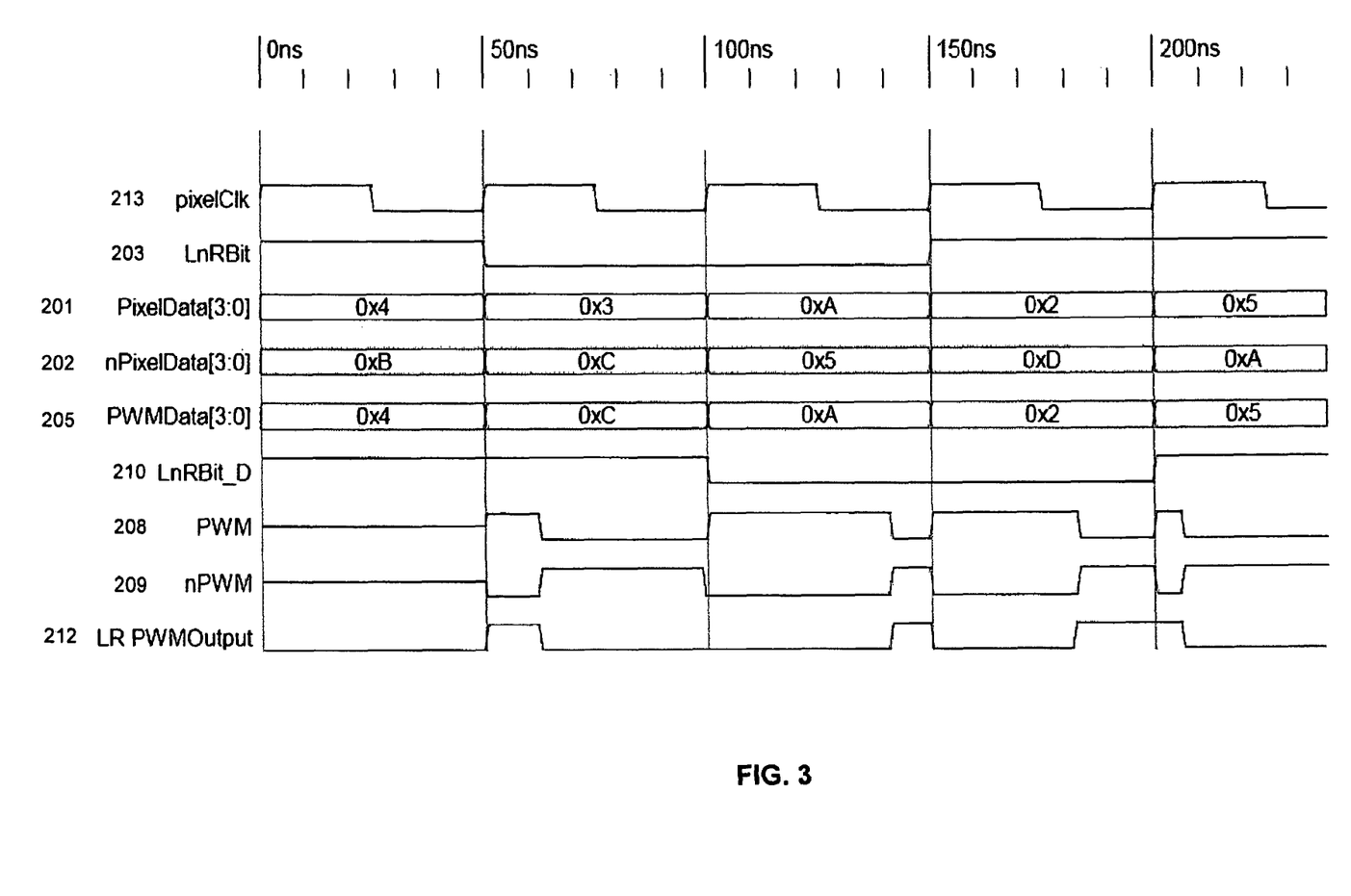
FIG. 3 shows a wave-form diagram showing exemplary data for the exemplary circuit of FIG. 2.

FIG. 3 is an exemplary wave form diagram for exemplary circuit 200. In the exemplary FIG. 3, LR_PWMOut 212 may represent the output waveform of circuit 200. As previously described, output LR_PWMOut 212 may be delayed by one clock cycle by the circuitry and represents the width indicated by Pixel Data 201. LnRBit 203 may be the left- or right-justification selection bit, and thus may determine whether LR_PWMOut 212 is pulsed at the beginning (e.g., left justified pixel) or at an intermediate point (e.g., right-justified pixel) of the clock period.

Signals PWM Data 205, LnRBit_D 210, PWMout 208, and Inverse_PWMout 209, shown in FIG. 3, may be internal to exemplary circuit 200. Alternatively, PWM Data 205, LnRBit_D 210, PWMout 208, and Inverse_PWMout 209 may be any combination of inputs, outputs, and internal signals of exemplary circuit 200. Signal LR_PWMout 212 may be output by exemplary circuit 200.

Figure 4A:
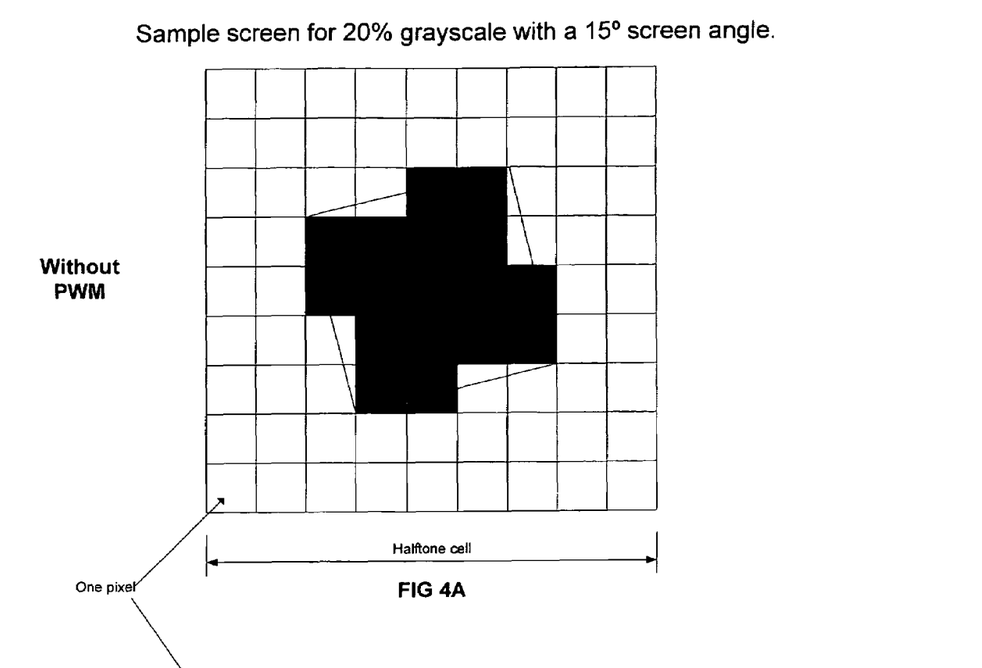
FIG. 4A shows a representation of the printed result from a typical printer using screens but without a PWM device.

FIG. 4A shows a representative halftone dot created by a typical printer without a PWM device, to print a 20% grayscale screen with a 15° screen angle. The desired dot is represented in FIG. 4A by a solid outline. Note that using a printer without a PWM, each pixel may either be filled in completely or not at all. The result when printing an angled dot without a PWM or justification circuitry may be a very crude representation of the desired dot, as a substantial portion of each edge pixel may be improperly shaded or blank when it would ideally be shaded.

Figure 4B:
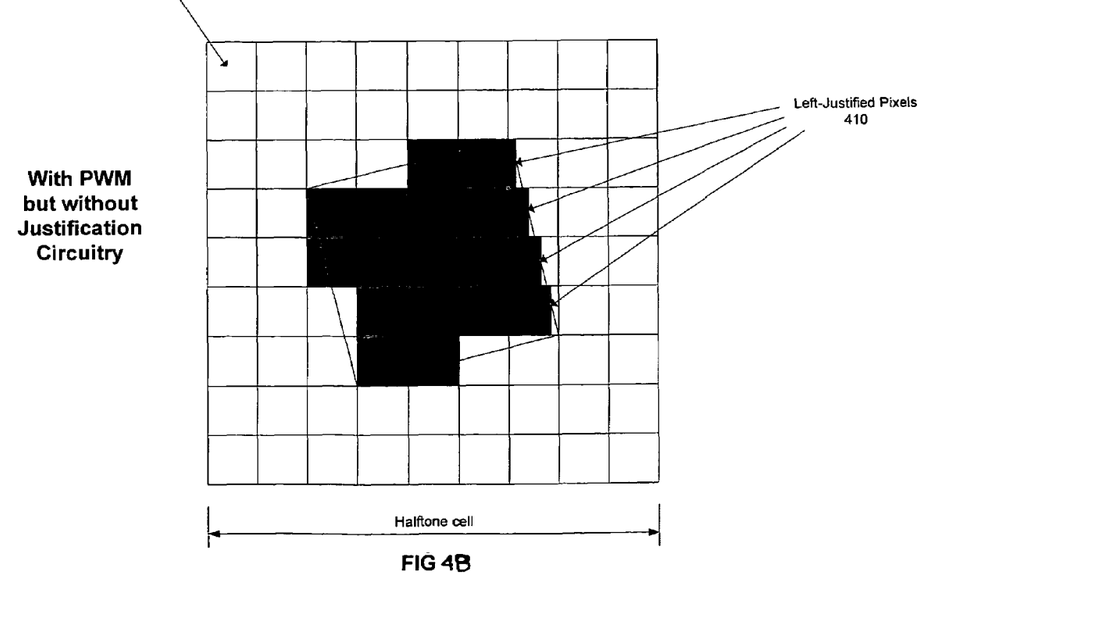
FIG. 4B shows the representation of the printed result from a representative printer using a left-justified PWM device without right-justification circuitry to print the same screen as in FIG. 4A.

FIG. 4B shows a representative halftone dot created by a typical printer using an inherently left-justified PWM device without justification circuitry to print the same screen as in FIG. 4A. The desired dot is represented in FIG. 4B by a solid outline. Note that the accuracy of the printed dot is improved only along the dot's right edge, where left-justification of the pulse-width-modified pixels is proper. Using an inherently left-justified PWM, the pixels at the right edge of the dot are left-justified pixels 410 that may be shaded only as far to the right as is necessary to provide the most accurate representation possible without top and bottom pixel justification.

Figure 4C:
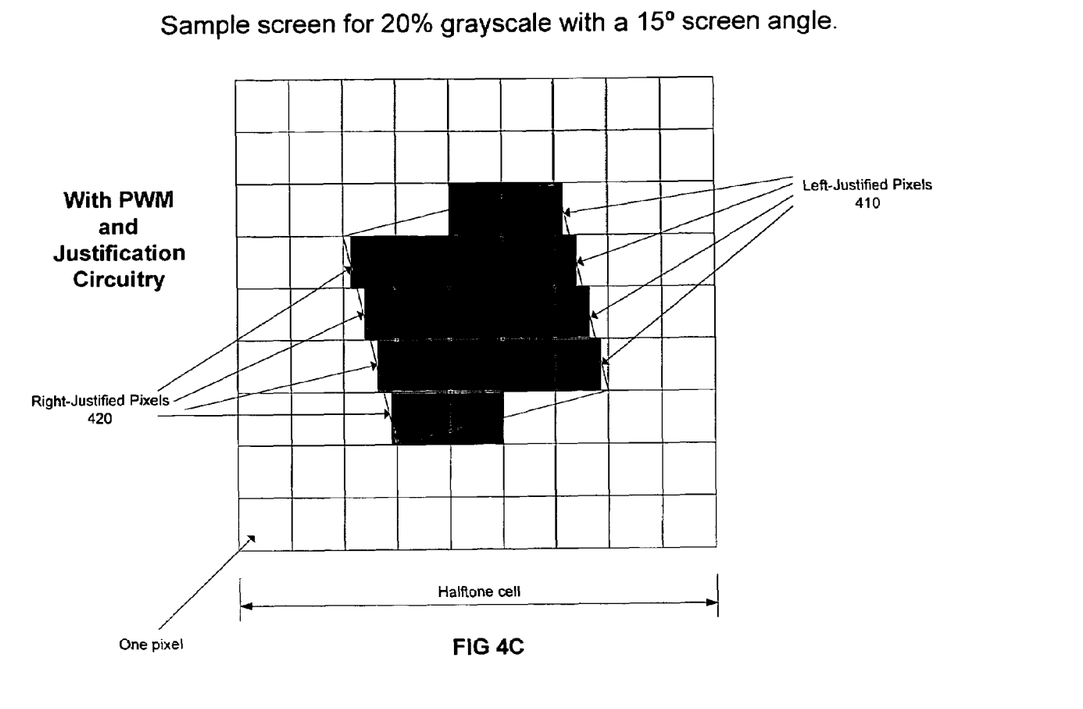
FIG. 4C shows a representation of the printed result from a representative printer using a PWM device and both left and right-justification circuitry to print the same screen as in FIG. 4A.

FIG. 4C shows a representative halftone dot created by an exemplary printer using a PWM and representative justification circuitry of the present invention to print the same screen as in FIG. 4A. The desired dot is represented in FIG. 4B by a solid outline. Note the greatly improved accuracy when using a PWM and the representative circuitry of the present invention. In FIG. 4B, partial pixels are used to construct the overall halftone dot. These partial pixels are right-justified on the left side of the halftone dot and left-justified on the right side. The pixels at the right side of the dot, left-justified pixels 410, are as described in the paragraph above. However, now the pixels at the left side of the printed dot are also optimized by shading left from the right edge only as far as necessary to provide the most accurate representation of each pixel as is possible without top and bottom pixel justification, creating right-justified pixels 420.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method comprising the steps of:
    determining, based on a justification selection signal, whether an output PWM signal that is to be generated based on first pixel data is to be right-justified or left-justified;
    generating an appropriate pixel data signal from one of the first pixel data and a second pixel data, the second pixel data being equivalent to a bitwise inverse of the first pixel data;
    generating at least one of a first and a second intermediate PWM signal based on the generated pixel data signal, the second intermediate PWM signal being equivalent to an inverse of the first intermediate PWM signal; and
    generating an appropriately justified output PWM signal based on one of the first and second intermediate PWM signals and the justification selection signal.

2. The method of claim 1, wherein the output PWM signal is left-justified.

3. The method of claim 1, wherein the output PWM signal is right-justified.

4. The method of claim 1, wherein generating an appropriately justified output PWM signal further comprises:
    selecting one of the first pixel data or the second pixel data; and
    generating the output PWM signal based on the selected pixel data.

5. The method of claim 4, wherein generating the output PWM signal based on the selected pixel data further comprises:
    generating the first intermediate PWM signal from the selected pixel data;
    inverting the first intermediate PWM signal to generate the second intermediate PWM signal; and
    choosing one of the first intermediate PWM signal and the second intermediate PWM signal for the output PWM signal.

6. The method of claim 5, wherein the first intermediate PWM signal is chosen when it is determined that the output PWM signal is to be generated based on the first pixel data.

7. The method of claim 5, wherein the second intermediate PWM signal is chosen when it is determined that the output PWM signal is to be generated based on the second pixel data.

8. A device comprising:
    a selector that selects one of a first pixel data and a second pixel data based on a justification selection signal, wherein the second pixel data is a bitwise inverse of the first pixel data; and the justification selection signal determines whether an output PWM signal that is to be generated based on first pixel data is to be right-justified or left-justified;
    a PWM circuit that generates at least one of a first and a second intermediate PWM signal based on the selected pixel data, the second intermediate PWM signal being an inverse of the first intermediate PWM signal; and
    a pixel alignment circuit that generates the output PWM signal based on one of the intermediate PWM signals and the justification selection signal.

9. The pixel alignment circuit of claim 8, wherein the PWM circuit:
    generates a first intermediate PWM signal from the selected pixel data, wherein the first intermediate PWM signal comprises either the left-justified or the right-justified intermediate PWM signal;
    inverts the first intermediate PWM signal to generate a second intermediate PWM signal, wherein the second intermediate PWM signal comprises either the right-justified or the left-justified intermediate PWM signal, respectively; and
    chooses one of the first intermediate PWM signal and the second intermediate PWM signal for the output PWM signal, based on the justification selection signal.

10. The device of claim 9, wherein the first intermediate PWM signal is chosen when the output PWM signal is to be generated based on the first pixel data.

11. The device of claim 9, wherein the second intermediate PWM signal is chosen when the output PWM signal is to be generated based on the second pixel data.

12. The device of claim 9, wherein the output PWM signal is left-justified.

13. The device of claim 9, wherein the output PWM signal is right-justified.

14. A method for generating a second justified PWM signal using pixel input data and an existing PWM circuit that is capable of generating a first justified PWM signal from the pixel input data comprising:
    inverting the pixel input data to form the bit-wise inverse of the pixel input data;
    selecting either the pixel input data or the inverted pixel input data based on a justification selection signal as input to the PWM circuit;
    generating an intermediate PWM signal based on the selected data;
    inverting the intermediate PWM signal to form the inverse of the PWM signal; and
    choosing either the intermediate PWM signal and the inverted intermediate PWM signal as the output PWM signal based on the justification selection signal.

15. The method of claim 14, wherein the second justified PWM signal corresponds to the output PWM signal when the inverted intermediate PWM signal is chosen as the output PWM signal.

16. The method of claim 14, wherein the first justified PWM signal is left-justified and the second justified PWM signal is right-justified.

17. The method of claim 16, wherein the method is performed to provide right and left justification capability to an existing printer design that offers only left justification.

18. The method of claim 14, wherein the first justified PWM signal corresponds to the output PWM signal when the intermediate PWM signal is chosen as the output PWM signal.

19. The method of claim 14, wherein the method is performed to provide a second justification capability to an existing printer design that offers only a first justification capability.

* * * * *